July 15, 1952    E. FRIED    2,603,338
SHEET METAL TRANSFER DEVICE
Filed Sept. 8, 1949    2 SHEETS—SHEET 2
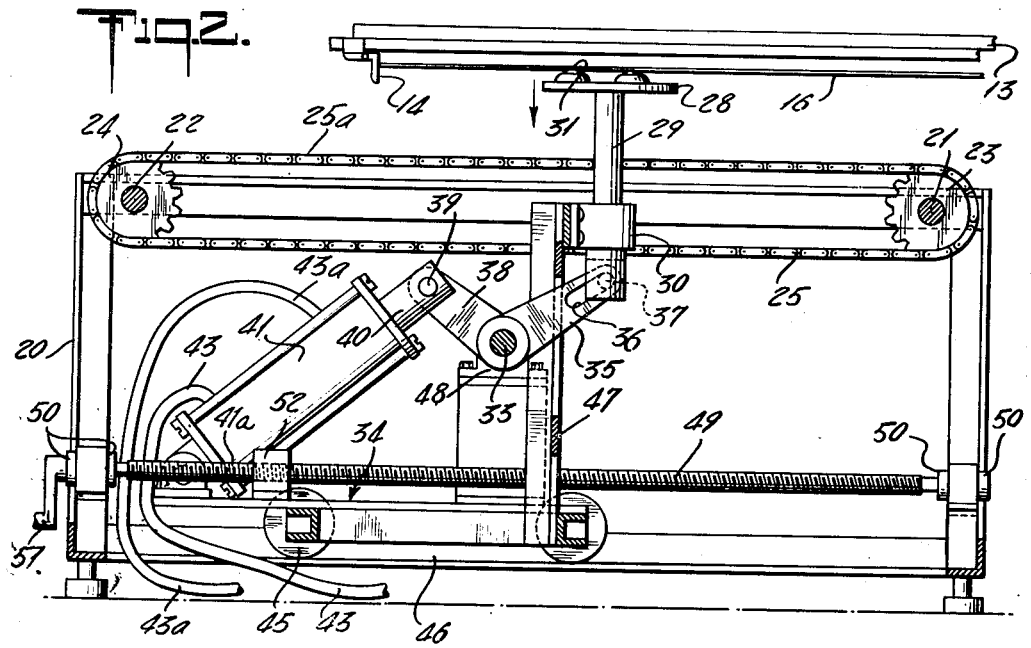
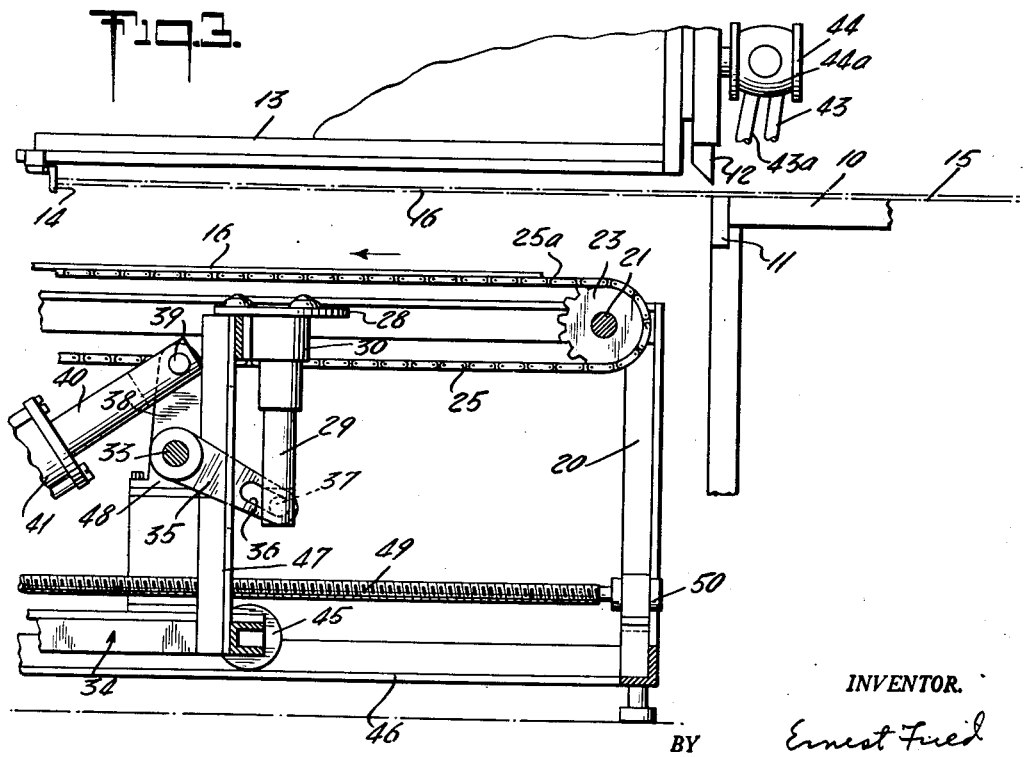
INVENTOR.
Ernest Fried
BY
ATTORNEY Patented July 15, 1952

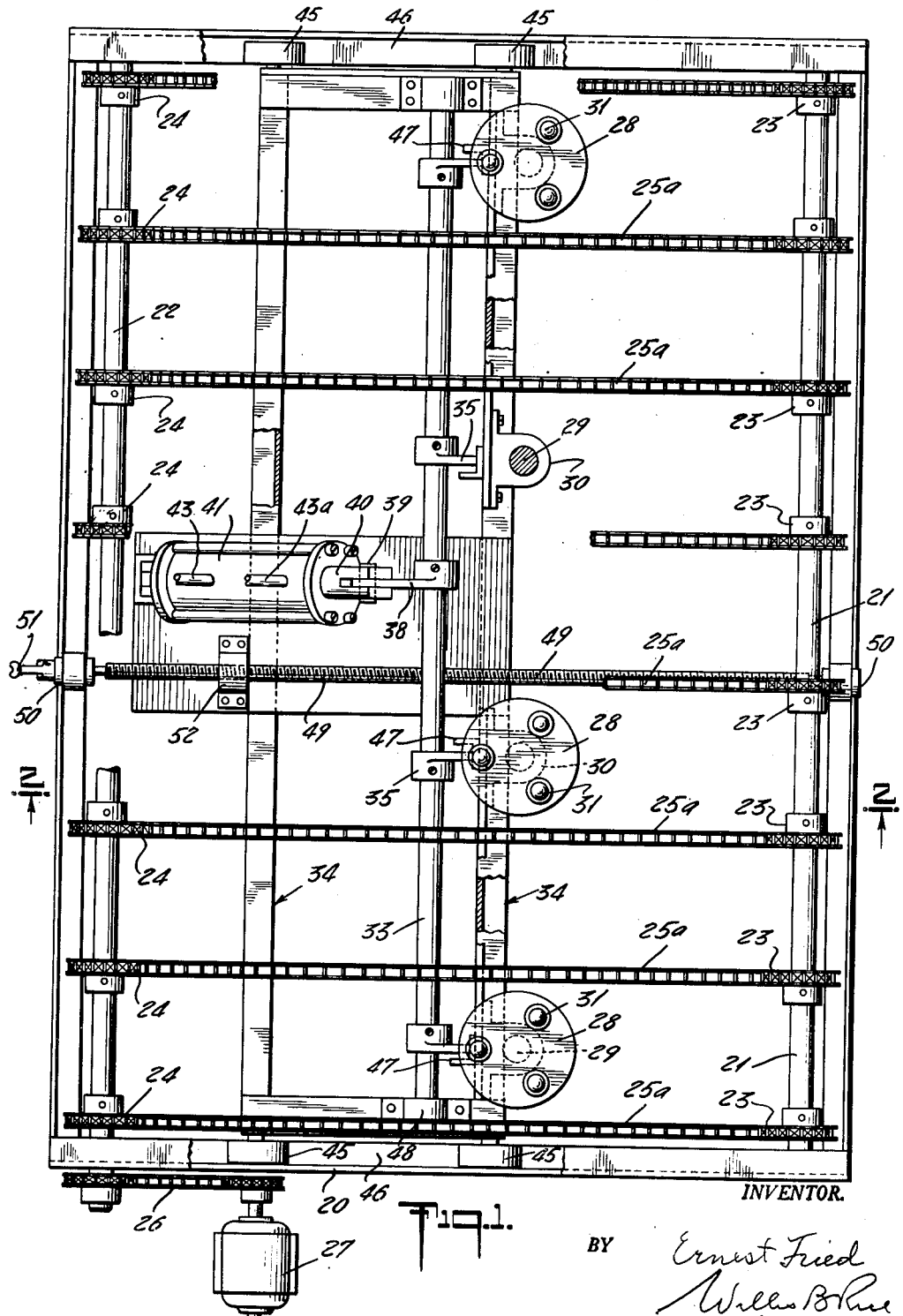

2,603,338

UNITED STATES PATENT OFFICE 2,603,338

SHEET METAL TRANSFER DEVICE

Ernest Fried, New York, N. Y.; Celia Fried administratrix of said Ernest Fried, deceased, assignor to Fried Steel Equipment Mfg. Corp., a corporation of New York Application September 8, 1949, Serial No. 114,501

1 Claim. (Cl. 198—20)

This invention relates to sheet metal handling devices, and more particularly to devices for receiving cut sheets from a shear and delivering them for stocking or other use.

In metal shears a piece, hereinafter referred to as a strip of sheet metal is fed between shearing blades until the overhanging portion encounters a fixed stop which determines the width of the portion to be sheared off.

It is an object of this invention to provide a device which will support the overhanging portion at the level of the bed of the shears, so that there will be no flexing of the sheet which makes the gauging and cutting uncertain.

For accurate cutting it is desirable that the stop gauge shall be rigid. For this reason it is an object of this invention to provide a machine which will move the cut sheet out of the way of the stop gauge, and deliver it at an easily accessible position.

The invention accordingly comprises a device possessing the features, properties and the relation of elements which will be exemplified in the device hereinafter described and the scope of the application of which will be indicated in the claim.

For a fuller understanding of the nature and objects of the invention, reference should be had to the following detailed description taken in connection with the accompanying drawings, in which:

Fig. 1 is a plan view of a machine embodying this invention in position to serve a shearing machine at the right of the page.

Fig. 2 is a section of the same on the line 2—2 of Fig. 1.

Fig. 3 is a fragmentary view showing the relation of the shear to the machine.

Referring for a moment to Fig. 3, the numeral 10 represents the bed plate of a shearing machine having a stationary shearing blade 11 and a movable blade 12. Extending out from the shear is a support 13 carrying an adjustable stop gauge 14. As is customary, the strip 15 of metal to be sheared is supported on the bed and is pushed outwardly beyond the blades 11 and 12 until the overhanging portion 16, which is to comprise the cut sheet, encounters the stop gauge 14, whereupon the strip is usually clamped to the bed while the movable shear blade comes down. Such mechanism comprises a conventional type of shear.

If such a shear be used only as described, difficulty is experienced in maintaining the accuracy of width of the sheared sheet because the overhanging portion bends downwardly, either encountering the stop gauge 14 at a lower level or passing below it altogether. It is an object of this machine to overcome this defect.

The machine of this invention comprises a frame 20 supporting two parallel transverse shafts, one 21 near to the shearing blades, and one 22 at the opposite side of frame 20. Each of these shafts carries one member of eight sets of cog wheels 23 or 24. Each of these sets of cog wheels supports an endless belt or chain 25. One of these shafts 21 or 22 is driven by a chain drive 26 from a motor 27, whereby the upper stretch 25a of these belts serves as a single conveyor, continuously moving away from the shearing position.

This conveyor is sufficiently below the level of the bed 10 of the shear and below the level of the stop gauge 14, so that when a sheet is lowered on to it, the sheet may be carried to the other side of the machine below the gauge.

Means are provided for supporting the sheet during gauging and shearing and for then lowering it on to the conveyor. This comprises a plurality of vertically movable supports 28, each carried by a vertical shaft 29 slidable in a bearing 30. The upper face of each of these supports preferably carries a plurality of anti-friction balls 31, so as to facilitate the movement of the overhanging portion 16 into stop engaging position. Each shaft 29 and its operating mechanism are so adjusted that when in its upper position the upper surface of the anti-friction balls is substantially in the plane of the bed plate 10, so that the supports may serve to support the strip while the gauging is being done without permitting any substantial flexing of the strip, but the supports 28 are movable to a lower position below the level of the stretches 25a of the belt in order to deposit the strip upon the conveyor. Several supports 28 are provided (four are shown in the drawing), each of which is spaced between adjacent belts 25.

Mechanism is provided for operating all of these supports 28 in unison. As shown, there is provided a transverse shaft 33 journalled in a carriage 34 carrying an arm 35 having a slot 36 in position to engage a pin 37 upon the vertical shaft 29, one such arrangement being provided for each of the supports 28, so that the oscillation of the shaft 33 will move all of the supports 28 in unison. Also firmly attached upon shaft 33 is an arm 38 pivoted at 39 to a piston 40 working in a cylinder 41, which in turn is pivoted to carriage 34 at 41a.

Compressed air is admitted to the cylinder 41 through a conduit 43 under control of a valve 44. This valve 44 may be conveniently located and may be operated by hand or it may be mounted, as shown at 44a in Fig. 3, upon the shear, in such position that the operating of the shearing head may itself actuate the piston 40 to lower the sheared strip on to the conveyor. The cylinder and piston may be actuated in one direction by compressed air and may be returned by spring action, but I prefer the positive movement of the piston in both directions by the air. On this account, two conduits 43 and 43a are provided and any conventional valve may be used to admit compressed air into either one of these two conduits and exhausting through the other.

The horizontal position of the supports 28 is varied in accordance with the width of the overhanging portion of the strip and it is preferably somewhat beyond the middle of the overlapping portion to prevent undue downward deflection of the portion of the strip beyond the support. At the same time, the support should give adequate support to the severed strip until it is lowered on to the conveyor. To make this adjustment possible, the carriage 34 is mounted on wheels 45 which travel on a track 46 upon the frame 20, and this carriage carries vertical brackets 47 which support bearings 48 for the shaft 33 and which support the bearings 30 of the vertical shafts 29. Thus the entire unit comprising the supports 28 and their operating mechanism may be moved toward or from the shearing mechanism at will, the conduits 43 and 43a being flexible to permit this movement.

To move the carriage 34 back and forth, a screw 49 is journalled in bearings 50 on the two ends of the machine and is operated by a crank 51, and this screw mates with a nut 52 upon the carriage 34. In this manner the carriage 34 and all of its supporting parts may be moved at will to bring it to the most desirable location for supporting the strip prior to, during and after severance.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claim is intended to cover all of the generic and specific features of the invention herein described, and all statements of the scope of the invention which as a matter of language might be said to fall therebetween.

I claim:

A metal handling device for use in combination with a bed, an adjustable stop against which work may be fed, said mechanism comprising a frame, a plurality of spaced conveyors carried by said frame, at a level below the normal level of the bed and stop, means for moving said conveyors horizontally, a plurality of supports each situated between a pair of said conveyors and movable from said normal level to a level below said conveyors, and means for moving all said supports in unison, a carriage mounted upon the frame, movable in the intended direction of adjustment of said stop, said supports being mounted upon said carriage, a transverse shaft mounted on said carriage, arm carried by said shaft having a pin-and-slot connection with said supports and a piston and cylinder mechanism for operating said shaft.

ERNEST FRIED.

REFERENCES CITED

The following references are of record in the file of this patent:

UNITED STATES PATENTS

| Number | Name | Date |
|---|---|---|
| 641,027 | Martin | Jan. 9, 1900 |
| 1,737,762 | Howe | Dec. 3, 1929 |
| 1,852,534 | Moore | Apr. 5, 1932 |
| 2,084,741 | Price | June 22, 1937 |
| 2,208,433 | Seft | July 16, 1940 |
| 2,217,020 | Jurgens et al. | Oct. 8, 1940 |
| 2,306,133 | Marsh | Dec. 22, 1942 |